US012233861B2

(12) United States Patent
Ono et al.

(10) Patent No.: US 12,233,861 B2
(45) Date of Patent: Feb. 25, 2025

(54) OBJECT RECOGNITION APPARATUS AND NON-TRANSITORY RECORDING MEDIUM

(71) Applicant: SUBARU CORPORATION, Tokyo (JP)

(72) Inventors: Tsubasa Ono, Tokyo (JP); Keiichi Watanabe, Tokyo (JP); Yu Yoshida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 307 days.

(21) Appl. No.: 17/871,233

(22) Filed: Jul. 22, 2022

(65) Prior Publication Data

US 2023/0045897 A1 Feb. 16, 2023

(30) Foreign Application Priority Data

Aug. 3, 2021 (JP) .................................. 2021-127281

(51) Int. Cl.
*B60W 30/095* (2012.01)
*G06V 20/58* (2022.01)

(52) U.S. Cl.
CPC ......... *B60W 30/0956* (2013.01); *G06V 20/58* (2022.01); *B60W 2420/403* (2013.01); *B60W 2554/4049* (2020.02)

(58) Field of Classification Search
CPC ....... B60W 30/0956; B60W 2420/403; B60W 2554/4049; G06V 20/58; G06V 10/25
See application file for complete search history.

(56) References Cited

U.S. PATENT DOCUMENTS

| 2011/0205042 A1* | 8/2011 | Takemura | ............. B60W 30/08 340/435 |
| 2012/0235852 A1* | 9/2012 | Hattori | ................... G01S 15/582 342/70 |
| 2016/0176399 A1* | 6/2016 | Takagi | ............ B60W 30/18154 701/301 |
| 2017/0329000 A1* | 11/2017 | Masui | ................... B60W 30/16 |
| 2018/0144128 A1* | 5/2018 | Hakuta | ..................... G06F 9/54 |

(Continued)

FOREIGN PATENT DOCUMENTS

| CN | 106897665 A | * | 6/2017 | ......... G06K 9/00355 |
| JP | 2004094825 A | * | 3/2004 | |

(Continued)

*Primary Examiner* — Donald J Wallace
*Assistant Examiner* — Jalal C Coduroglu
(74) *Attorney, Agent, or Firm* — Rimon P.C.

(57) ABSTRACT

An object recognition apparatus includes at least one processor and at least one memory communicably coupled to the processor. The processor sets one or more object presence regions in each of which an object is likely to be present, on the basis of observation data of a distance sensor. The processor estimates an attribute of the object that is likely to be present in each of the one or more object presence regions. The processor sets, on the basis of the attribute of the object, a level of processing load to be spent on object recognition processing to be executed for each of the one or more object presence regions by using at least image data generated by an imaging device. The processor performs, for each of the one or more object presence regions, the object recognition processing corresponding to the set level of the processing load.

12 Claims, 7 Drawing Sheets

(56) References Cited

U.S. PATENT DOCUMENTS

| | | | |
|---|---|---|---|
| 2019/0146843 A1* | 5/2019 | Zeng | G06F 9/45533 |
| | | | 718/104 |
| 2019/0244037 A1* | 8/2019 | Inata | H04N 23/60 |
| 2019/0268072 A1* | 8/2019 | Aoyama | H04B 10/116 |
| 2020/0103649 A1* | 4/2020 | Higashiyama | B60K 35/81 |
| 2020/0242842 A1* | 7/2020 | Fukazawa | G06T 7/11 |
| 2021/0233284 A1* | 7/2021 | Sugio | G06T 9/40 |
| 2021/0341597 A1* | 11/2021 | Yoshitake | G08G 1/167 |
| 2022/0001896 A1* | 1/2022 | Watanabe | G01C 21/3492 |
| 2022/0026567 A1* | 1/2022 | Yoshitake | G08G 1/166 |
| 2022/0153262 A1* | 5/2022 | Gallo | G01S 7/417 |
| 2022/0207883 A1* | 6/2022 | Watanabe | G05D 1/2464 |

FOREIGN PATENT DOCUMENTS

| | | | |
|---|---|---|---|
| JP | 2006003263 A | * | 1/2006 |
| JP | 2009129388 A | * | 6/2009 |
| JP | 2010-086268 A | | 4/2010 |
| JP | 2010-093610 A | | 4/2010 |
| JP | 2011-134119 A | | 7/2011 |
| JP | 2019185347 A | * | 10/2019 |

* cited by examiner

| | TYPE ESTIMATION PROCESS | DISTANCE ESTIMATION PROCESS | SPEED ESTIMATION PROCESS | SIZE ESTIMATION PROCESS | ENERGY ESTIMATION PROCESS |
|---|---|---|---|---|---|
| REGULAR PROCESSING | • LANE LINE RECOGNITION PROCESS<br>• CURB RECOGNITION PROCESS<br>• SIGN RECOGNITION PROCESS<br>• FEATURE MATCHING PROCESS | EXECUTED | NOT EXECUTED | NOT EXECUTED | NOT EXECUTED |
| LOW-PRECISION PROCESSING (LOW-LOAD PROCESSING) | • EDGE DETECTION PROCESS<br>• TYPE ESTIMATION PROCESS BY SHAPE FEATURE EXTRACTION | EXECUTED | EXECUTED | EXECUTED | EXECUTED |
| HIGH-PRECISION PROCESSING (HIGH-LOAD PROCESSING) | • EDGE DETECTION PROCESS<br>• TYPE ESTIMATION PROCESS BY SHAPE FEATURE EXTRACTION<br>• TYPE ESTIMATION PROCESS BY MACHINE LEARNING | EXECUTED | EXECUTED | EXECUTED | EXECUTED |

FIG. 3

OBJECT RECOGNITION APPARATUS AND NON-TRANSITORY RECORDING MEDIUM

CROSS-REFERENCE TO RELATED APPLICATIONS

The present application claims priority from Japanese Patent Application No. 2021-127281 filed on Aug. 3, 2021, the entire contents of which are hereby incorporated by reference.

BACKGROUND

The technology relates to an object recognition apparatus and a non-transitory recording medium applicable to a vehicle.

An object recognition technique has been developed for an automatic driving technique and an advanced driver assistance system of recent vehicles. The object recognition technique utilizes an imaging device, such as a monocular camera or a stereo camera, or a distance sensor using electromagnetic waves, such as a light detection and ranging or laser imaging detection and ranging (LiDAR) or a millimeter-wave radar. For example, reference is made to Japanese Unexamined Patent Application Publication Nos. 2011-134119, 2010-093610, and 201.0-086268.

SUMMARY

An aspect of the technology provides an object recognition apparatus including one or more processors and one or more memories. The one or more memories are communicably coupled to the one or more processors. The one or more processors are configured to set one or more object presence regions in each of which an object is likely to be present, on the basis of observation data of a distance sensor. The distance sensor is configured to receive a reflected wave of an applied electromagnetic wave. The one or more processors are configured to estimate an attribute of the object that is likely to be present in each of the one or more object presence regions. The one or more processors are configured to set, on the basis of the attribute of the object, a level of processing load to be spent on object recognition processing to be executed for the each of the one or more object presence regions by using at least image data generated by an imaging device. The one or more processors are configured to perform, for the each of the one or more object presence regions, the object recognition processing corresponding to the set level of the processing load.

An aspect of the technology provides an object recognition apparatus including an object presence region setting unit, a processing load level setting unit, and an object recognition processing unit. The object presence region setting unit is configured to set one or more object presence regions in each of which an object is likely to be present, on the basis of observation data of a distance sensor, and estimate an attribute of the object that is likely to be present in each of the one or more object presence regions. The distance sensor is configured to receive a reflected wave of an applied electromagnetic wave. The processing load level setting unit is configured to set, on the basis of the attribute of the object, a level of processing load to be spent on object recognition processing to be executed for the each of the one or more object presence regions by using at least image data generated by an imaging device. The object recognition processing unit is configured to perform, for the each of the one or more object presence regions, the object recognition processing corresponding to the set level of the processing load.

An aspect of the technology provides a non-transitory recording medium containing a computer program. The computer program causes, when executed by a processor, the processor to implement a method. The method includes: setting one or more object presence regions in each of which an object is likely to be present, on the basis of observation data of a distance sensor, the distance sensor being configured to receive a reflected wave of an applied electromagnetic wave; estimating an attribute of the object that is likely to be present in each of the one or more object presence regions; setting, on the basis of the attribute of the object, a level of processing load to be spent on object recognition processing to be executed for the each of the one or more object presence regions by using at least image data generated by an imaging device; and performing, for the each of the one or more object presence regions, the object recognition processing corresponding to the set level of the processing load.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 3 is an explanatory diagram illustrating, for each processing load level, object recognition processing that is executed by an object recognition processing unit according to one example embodiment.

DETAILED DESCRIPTION

A system relying on one of an imaging device or a distance sensor is mainly used at present. It is expected that utilizing both the imaging device and the distance sensor makes it possible to: duplex the system to enhance reliability of an object recognition result; lessen arithmetic processing load to lessen hardware load; and consequently improve safety of the system.

For example, in a case of a system greatly relying on an imaging device in terms of an object recognition technique; it is desired to ensure safety by exerting processes utilizing hardware resources of the imaging device on the entire human sight. The processes include, for example, a recognition process, a type estimation process, and a relative speed estimation process for an object. However, it is necessary to increase the hardware resources to meet such a demand by only the technique of the imaging device. For example, the imaging device executes the processes described above by scanning the entire observation range in front of a vehicle. To execute the processes described above without increasing the hardware resources, it is necessary to reduce resolution by, for example, reducing the number of pixels, which can cause a decrease in reliability. This can result in a limitation on future implementation of various kinds of processing, function extension, and improvement in system reliability.

It is desirable to provide an object recognition apparatus and a non-transitory recording medium that make it possible to improve reliability of an object recognition result while lessening arithmetic processing load.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Configuration of Vehicle

Described first is an example of an overall configuration of a vehicle to which an object recognition apparatus according to an example embodiment of the technology is applicable. Described in the following example embodiments is an example of the object recognition apparatus using a LiDAR as an example of a distance sensor.

Figure 1:
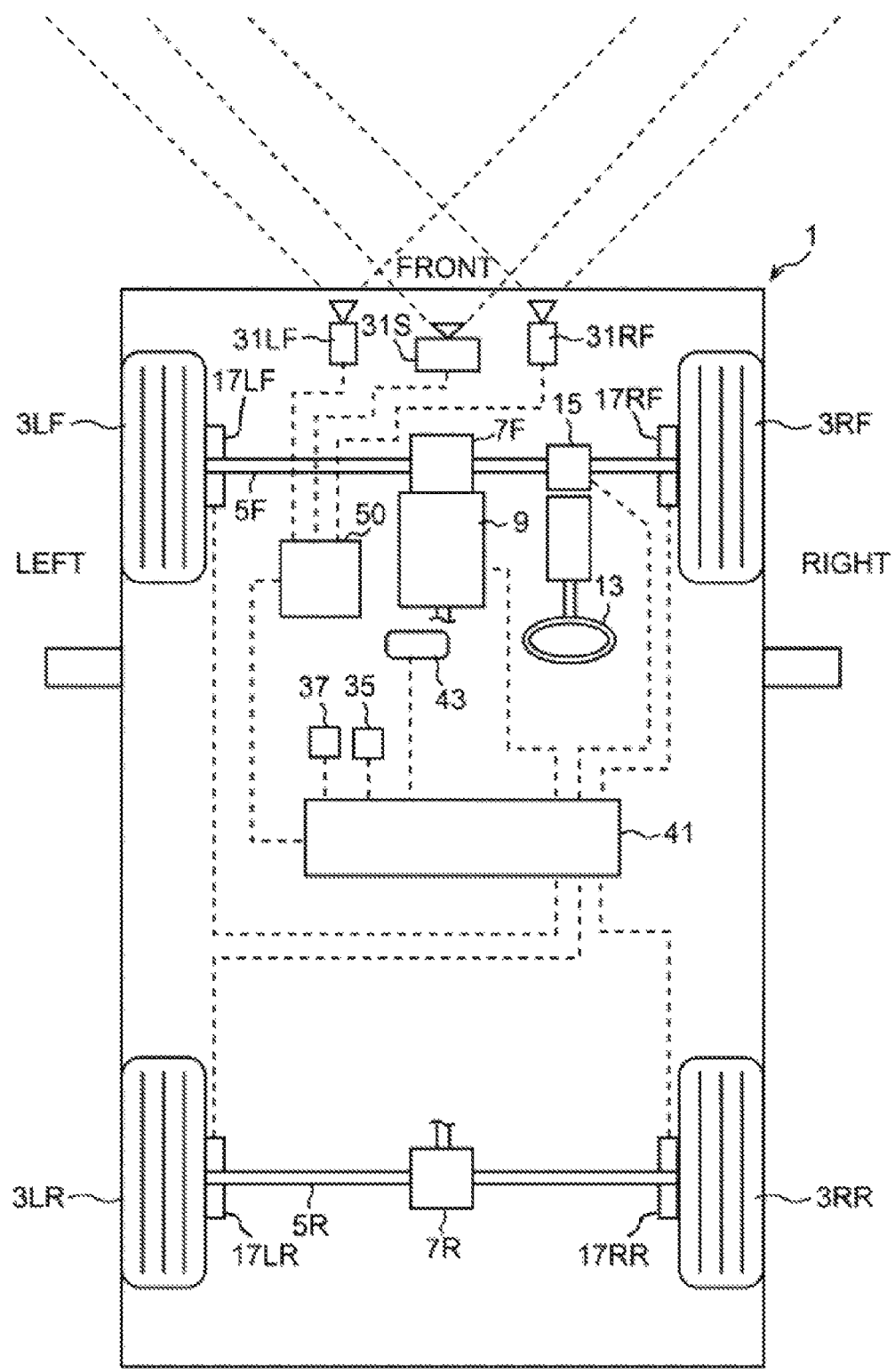
FIG. 1 is a schematic diagram illustrating an example configuration of a vehicle including an object recognition apparatus according to one example embodiment of the technology.

FIG. 1 is a schematic diagram illustrating an example configuration of a vehicle 1 including an object recognition apparatus 50 according to the example embodiment. The vehicle 1 illustrated in FIG. 1 may be configured as a four-wheel-drive vehicle that transmits driving torque to a left front wheel 3LF, a right front wheel 3RF, a left rear wheel 3LR, and a right rear wheel 3RR (hereinafter collectively referred to as "wheels 3" unless a distinction is to be made between them). The driving torque is outputted from a driving force source 9 that generates vehicle driving torque. The driving force source 9 may be an internal combustion engine or a drive motor, or may include both the internal combustion engine and the drive motor. Non-limiting examples of the internal combustion engine may include a gasoline engine and a diesel engine.

The vehicle 1 may be, for example, an electric vehicle including two drive motors of a front wheel drive motor and a rear wheel drive motor, or an electric vehicle including drive motors corresponding to the respective wheels 3. In a case where the vehicle 1 is an electric vehicle or a hybrid electric vehicle, the vehicle 1 may be mounted with a secondary battery that stores electric power to be supplied to the drive motor, and an electric power generator that generates electric power to be used to charge the battery. Non-limiting examples of the electric power generator may include a motor and a fuel cell.

The vehicle 1 may include, as equipment to be used for driving control of the vehicle 1, the driving force source 9, an electric steering system 15, and brake devices 17LF, 17RF, 17LR, and 17RR (hereinafter collectively referred to as "brake devices 17" unless a distinction is to be made between them). The driving force source 9 may output the driving torque to be transmitted to a front-wheel drive shaft 5F and a rear-wheel drive shaft 5R via an unillustrated transmission and a front-wheel differential mechanism 7F and a rear-wheel differential mechanism 7R. Driving of the driving force source 9 and the transmission may be controlled by a vehicle control apparatus 41 including one or more electronic control units (ECUs).

The front-wheel drive shaft 5F may be provided with the electric steering system 15. The electric steering system 15 may include an unillustrated electric motor and an unillustrated gear mechanism. The electric steering system 15 may be controlled by the vehicle control apparatus 41 to adjust a steering angle of the left front wheel 3LF and the right front wheel 3RF. During manual driving, the vehicle control apparatus 41 may control the electric steering system 15 on the basis of a steering angle of a steering wheel 13 operated by a driver who drives the vehicle 1. During automatic driving, the vehicle control apparatus 41 may control the electric steering system 15 on the basis of a target steering angle that is set in accordance with a planned travel course on which contact with an obstacle is avoidable.

The brake devices 17LF, 17RF, 17LR, and 17RR may give braking force respectively to the left-front, right-front, left-rear, and right-rear drive wheels 3LF, 3RF, 3LR, and 3RR. The brake device 17 may be configured as a hydraulic brake device, for example. Hydraulic pressure to be supplied to each of the brake devices 17 may be controlled by the vehicle control apparatus 41 to generate predetermined braking force. In a case where the vehicle 1 is an electric vehicle or a hybrid electric vehicle, the brake device 17 may be used in combination with regenerative braking performed by the drive motor.

The vehicle control apparatus 41 may include one or more electronic control units that control driving of the driving force source 9, the electric steering system 15, and the brake device 17. The driving force source 9 may output the driving torque for the vehicle 1. The electric steering system 15 may control the steering angle of the steering wheel 13 or steered wheels. The brake device 17 may control the braking force for the vehicle 1. The vehicle control apparatus 41 may be configured to control driving of the transmission that changes in speed an output outputted from the driving force source 9 and transmits the output changed in speed to the wheels 3. The vehicle control apparatus 41 may be configured to execute automatic driving control and emergency braking control for the vehicle 1 by using information on an obstacle that is recognized by the object recognition apparatus 50.

The vehicle 1 may include a pair of left and right front imaging cameras 31LF and 31RF, a LiDAR 31S, a vehicle state sensor 35, a global positioning system (GPS) sensor 37, a human machine interface (HMI) 43, and the object recognition apparatus 50. The vehicle state sensor 35, the GPS sensor 37, the HMI 43, and the object recognition apparatus 50 may be coupled to the vehicle control apparatus 41 via a dedicated line or via a communication system, such as a controller area network (CAN) or local internet (LIN).

The front imaging cameras 31LF and 31RF may perform imaging of a region in front of the vehicle 1 to generate image data. The front imaging cameras 31LF and 31RF may each be an imaging device including an image sensor, such as a charged-coupled device (CCD) or a complementary metal-oxide-semiconductor (CMOS). The front imaging cameras 31LF and 31RF may be communicably coupled to the object recognition apparatus 50 by a wired or wireless communication system. The front imaging cameras 31LF and 31RF may transmit the generated image data to the object recognition apparatus 50.

In the vehicle 1 illustrated in FIG. 1, the front imaging cameras 31LF and 31RF may be configured as a stereo camera including the pair of left and right cameras, but may be a monocular camera including one imaging camera. The vehicle 1 may include, in addition to the front imaging cameras 31LF and 31RF, a camera that performs imaging of a region in the rear of the vehicle 1, or a camera that is provided on a side-view mirror, for example, to perform imaging of a left rear region or a right rear region.

In one embodiment, the LiDAR 31S may serve as the "distance sensor". The LiDAR 31S may apply laser light, i.e., optical waves, in a plurality of directions in front of the vehicle 1, and receive reflected light, i.e., reflected waves, of the laser light. The LiDAR 31S may detect three-dimensional positions of reflection points on the basis of data on the received reflected light. The laser light may be a type of electromagnetic wave. For example, the LiDAR 31S may be a time-of-flight (ToF) LiDAR that detects the three-dimensional position of each reflection point on the basis of data on a direction from which the reflected light is received and data on a time period from the application of the laser light to the reception of the reflected light. The LiDAR 31S may detect the three-dimensional positions of the reflection points further on the basis of intensity of the reflected light. In another example, the LiDAR 3.1S may be a frequency modulated continuous wave (FMCW) LiDAR that radiates light with linearly changed frequency, and detects the three-dimensional position of each reflection point on the basis of data on a direction from which reflected light is received and data on a phase difference, from the frequency, of the reflected light. The LiDAR 31S may be provided at an upper part of a front windshield in a vehicle compartment or at the front of a vehicle body, for example, to be able to apply the laser light frontward.

The LiDAR 31S may be a so-called scanning LiDAR that performs scanning in a horizontal direction or a vertical direction with a plurality of pieces of laser light arranged in a line along the vertical direction or the horizontal direction. The LiDAR 31S may be a LiDAR of a type that generates reflection point cloud data by applying laser light over a wide range, imaging reflected light reflected by an object by means of a three-dimensional distance image sensor, and analyzing the three-dimensional positions of the reflection points. The LiDAR 31S may be communicably coupled to the object recognition apparatus 50 by a wired or wireless communication system. The LiDAR 31S may transmit the detected reflection point cloud data to the object recognition apparatus 50.

Note that the distance sensor using electromagnetic waves is not limited to the LiDAR 31S, and may be a radar sensor such as a millimeter-wave radar, or another sensor such as an ultrasonic sensor.

The vehicle state sensor 35 may include one or more sensors that detect an operation state and a behavior of the vehicle 1 (hereinafter, also collectively referred to as a "traveling state of the vehicle"). For example, the vehicle state sensor 35 may include one or more of a steering angle sensor, an accelerator position sensor, a brake stroke sensor, a brake pressure sensor, or an engine speed sensor. The vehicle state sensor 35 may thus detect the operation state of the vehicle 1, such as the steering angle of the steering wheel 13 or the steered wheels, an accelerator position, a brake operation amount, or an engine speed. For example, the vehicle state sensor 35 may include one or more of a vehicle speed sensor, an acceleration rate sensor, or an angular speed sensor. The vehicle state sensor 35 may thus detect the behavior of the vehicle, such as a vehicle speed, a longitudinal acceleration rate, a lateral acceleration rate, or a yaw rate. The vehicle state sensor 35 may transmit a sensor signal including the detected information to the vehicle control apparatus 41.

In the example embodiment, the vehicle state sensor 35 may include at least the vehicle speed sensor. The vehicle speed sensor may be an encoder that detects a wheel speed, an encoder that detects the number of revolutions of the drive motor serving as the driving force source 9, or a laser Doppler sensor. In another example, the vehicle speed sensor may be a speed estimation module utilizing a self-position estimation technique by simultaneous localization and mapping (SLAM) using, for example, a distance sensor or a camera.

The GPS sensor 37 may receive satellite signals from OPS satellites. The GPS sensor 37 may transmit, to the vehicle control apparatus 41, position information of the vehicle 1 on map data included in the received satellite signal. In place of the GPS sensor 37, an antenna may be provided to receive satellite signals from another satellite system that identifies the position of the vehicle 1.

The HMI 43 may be driven by the vehicle control apparatus 41 to present various pieces of information to an occupant of the vehicle 1 by, for example, displaying an image or outputting sound. The HMI 43 may include, for example, a display provided on an instrument panel and a speaker provided in the vehicle 1. The display may be a display of a navigation system.

2. Object Recognition Apparatus

Next, the object recognition apparatus 51) according to the example embodiment is described in detail.

2-1. Example Configuration

Figure 2:
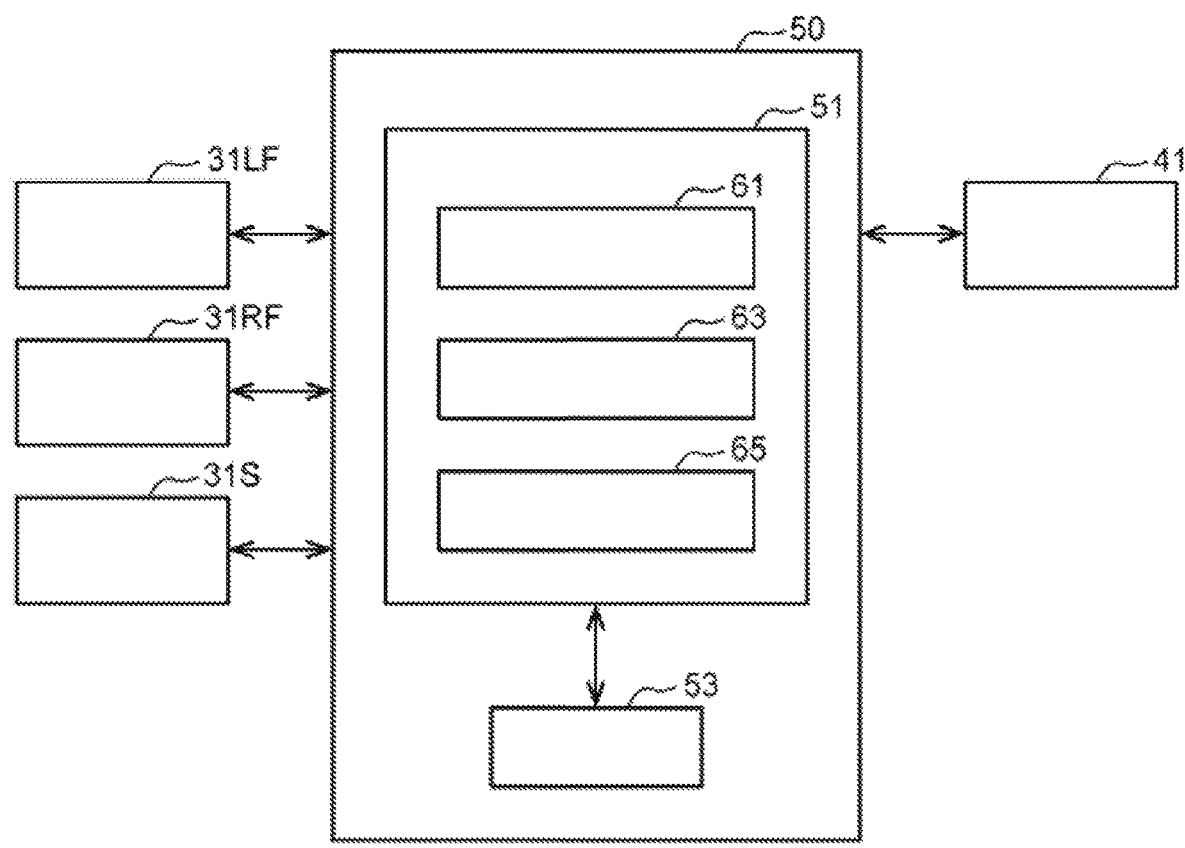
FIG. 2 is a block diagram illustrating an example configuration of the object recognition apparatus according to one example embodiment.

FIG. 2 is a block diagram illustrating an example configuration of the object recognition apparatus 50 according to the example embodiment.

The object recognition apparatus 50 may include a controller 51 and a storage 53. The controller 51 may include one or more processors. Non-limiting examples of the one or more processors may include a central processing unit (CPU). The controller 51 may partially or entirely be updatable software such as firmware, or a program module to be executed in response to a command from the CPU, for example.

The storage 53 may include one or more memories communicably coupled to the controller 51. Non-limiting examples of the one or more memories may include a random access memory (RAM) and a read only memory (ROM). Note that the storage 53 is not particularly limited in number or type. The storage 53 may hold data including a computer program to be executed by the controller 51, various parameters to be used in arithmetic processing, detection data, and calculation results. In addition, the object recognition apparatus 50 may include an unillustrated interface for data transmission and reception to and from the front imaging cameras 31LF and 31RF, the LiDAR 31S, and the vehicle control apparatus 41.

2-2. Configuration

The controller 51 of the object recognition apparatus 50 may execute object recognition processing on the basis of data that is transmitted from the front imaging cameras 31LF and 31RF and the LiDAR 31S. In any embodiment of the technology, the controller 51 may set an object presence region in which an object is likely to be present on the basis of detection data obtained by the LiDAR 31S, and set a level of processing load to be spent on the object recognition processing to be executed for each object presence region. For each object presence region, the controller 51 may execute the object recognition processing corresponding to the set level of the processing load.

The object recognition processing using observation data of the LiDAR 31S may have lower accuracy than the object recognition processing using image data generated by the imaging device, but may estimate presence itself of some object with high accuracy. Accordingly, any embodiment of the technology may be configured to set the object presence region on the basis of the observation data of the LiDAR 31S, and concentrate, on the object presence region, resources of the object recognition processing using at least the image data of the front imaging cameras 31LF and 31RF.

In the following description, a "detection range" of the LiDAR 31S may refer to a region in which the object recognition processing using the detection data obtained by the LiDAR 31S is to be executed. The "detection range" may be a region obtained by projecting a laser light application range in real space on a two-dimensional plane having the vertical direction and the horizontal direction. The vertical direction and the horizontal direction may be the vertical direction and the horizontal direction for the LiDAR 31S, and may be set for the LiDAR 31S in advance. The LiDAR 31S may be mounted to have the vertical direction parallel to a height direction of the vehicle 1 and the horizontal direction parallel to a plane perpendicular to the height direction of the vehicle 1. In another example, the vertical direction and the horizontal direction may be adjustable to any directions by coordinate conversion of a three-dimensional space of the LiDAR 31S.

As illustrated in FIG. 2, the controller 51 of the object recognition apparatus 50 includes an object presence region setting unit 61, a processing load level setting unit 63, and an object recognition processing unit 65. The object presence region setting unit 61, the processing load level setting unit 63, and the object recognition processing unit 65 may be implemented by execution of a computer program by the one or more processors, such as the CPU. Note that a part or all of the object presence region setting unit 61, the processing load level setting unit 63, and the object recognition processing unit 65 may be configured by hardware such as an analog circuit.

Object Presence Region Setting Unit

The object presence region setting unit 61 executes a process of setting an object presence region in which an object is likely to be present on the basis of the observation data of the LiDAR 31S, and a process of estimating an attribute of the object that is likely to be present in each object presence region. For example, the object presence region setting unit 61 may acquire, from the LiDAR 31S, the reflection point cloud data based on the reflected light received by the LiDAR 31S, and determine whether an object is present in front of the vehicle 1 on the basis of the reflection point cloud data. The object presence region setting unit 61 may set a region in which an object is determined as being present as the object presence region.

The reflection point cloud data may include information on the three-dimensional positions of the reflection points. The three-dimensional position of each reflection point may be detected on the basis of data on a direction of the reflection point as seen from the vehicle 1, and data on a time period from the application of the laser light to the reception of the reflected light by the LiDAR 31S. The reflection point cloud data may further include data on the intensity of the received reflected light. For example, the object presence region setting unit 61 may execute, on the basis of the information on the three-dimensional positions of the reflection points, a clustering process of grouping reflection points between which distance is shorter than a predetermined distance. Thereafter, in a case where an area of a region in which the grouped reflection point cloud is present exceeds a predetermined range set in advance, the object presence region setting unit 61 may set the region as the object presence region.

The object presence region setting unit 61 also estimates the attribute of the object that is likely to be present in each object presence region. The attribute of the object may include information on a distance from the vehicle 1 to the object, a size of the object, and a movement speed of the object. The information on the movement speed of the object may be information on a relative speed between the vehicle 1 and the object. The object presence region setting unit 61 may calculate the distance to the object, from a position of each object presence region in the detection range of the LiDAR 31S. The object presence region setting unit 61 may calculate the size of the object as seen from the vehicle 1, on the basis of a size of an outer shape of the reflection point cloud grouped in the detection range of the LiDAR 31S, and the distance to the object. In another example, in a case where density of the laser light applied by the LiDAR 31S is uniform, the object presence region setting unit 61 may calculate the size of the object as seen from the vehicle 1, on the basis of the number of the grouped reflection points.

The object presence region setting unit 61 may calculate, on the basis of a temporal change in the distance to the object that is calculated in time series, the relative speed between the vehicle 1 and the object in a direction crossing a traveling direction of the vehicle 1. The object presence region setting unit 61 may calculate, on the basis of the temporal change in the distance to the object or a temporal change in the size of the object, the relative speed between the vehicle 1 and the object in the traveling direction of the vehicle 1. Furthermore, the object presence region setting unit 61 may calculate the movement speed of the object in each of the direction crossing the traveling direction of the vehicle 1 and the traveling direction of the vehicle 1, on the basis of the relative speed of the object in the corresponding direction and a movement speed of the vehicle 1 in the corresponding direction. The temporal change in the distance to the object or the size of the object may be calculated by, for example, comparing an image frame of the detection range that is generated by one scanning process of the LiDAR 31S, with an image frame 2 to 30 frames earlier. The interval number of frames may be set as appropriate on the basis of, for example, a degree of reliability of the LiDAR 31S or the intensity of the reflected light.

Note that contents of the process of setting the object presence region by the object presence region setting unit 61 are not limited to the example described above. For example, the object presence region setting unit 61 may set the object presence region along an edge of the acquired reflection point cloud. In another example, the object presence region setting unit 61 may set, as the object presence region, a region expanded beyond the edge by a predetermined size. Similarly, contents of the process of estimating the attribute of the object b the object presence region setting unit 61 are not limited to the example described above.

Processing Load Level Setting Unit

On the basis of the attribute of the object calculated by the object presence region setting unit 61, the processing load level setting unit 63 executes a process of setting, for the object presence region, a level of processing load to be spent on the object recognition processing to be executed by using at least the image data generated by the front imaging cameras 31LF and 31RF. The level of the processing load may be information that indicates an allowable upper limit for an amount of resources of the controller 51 used to execute the object recognition processing. The level of the processing load, i.e., a processing load level, may be set in accordance with a contact risk of the object, and may be set to a higher level as the contact risk is greater. The contact risk may be estimated from the attribute of the object that is likely to be present in each object presence region. The contact risk may be a concept representing the possibility of the object and the vehicle 1 coming into contact or the extent of damage that is assumed upon contact.

In the example embodiment, the processing load level setting unit 63 may set the level of the processing load to one of a regular processing level at which the processing load is low or a precision processing level at which the processing load is higher than at the regular processing level. The precision processing level may be further divided into a low-precision processing level at which the processing load is relatively low and a high-precision processing level at which the processing load is relatively high.

In the example embodiment, the processing load level setting unit 63 may assign points for each of the calculated distance to the object, size of the object, and relative speed or movement speed of the object, and set the processing load level in accordance with the sum of points. Table 1 illustrates an example of assigning points in accordance with the distance to the object, the size of the object, and the movement speed of the object, Table 2 illustrates an example of setting the processing load level in accordance with the sum of points.

TABLE 1

| | | | |
|---|---|---|---|
| a. Distance | Less than 50 m | 50 m or more and less than 100 m | 100 m or more |
| b. Size | 4 m$^2$ or more | 2 m$^2$ or more and less than 4 m$^2$ | Less than 2 m$^2$ |
| c. Speed | 50 km/h or more | 20 km/h or more and less than 50 km/h | Less than 20 km/h |
| Points | 5 | 3 | 1 |

TABLE 2

| Sum of points | Processing load level |
|---|---|
| 9 points or more | High-precision processing level |
| 5 points or more and 8 points or less | Low-precision processing level |
| 4 points or less | Regular processing level |

In the examples illustrated in Table 1 and Table 2, more points may be assigned as the contact risk is higher, and higher-load processing contents may be set as the sum of points is larger. In other words, setting may be performed to make the processing load higher as the contact risk is greater, thus enhancing the accuracy of the object recognition processing by spending hardware resources in a concentrated manner. Because the precision processing level is divided into the low-precision processing level and the high-precision processing level, it is possible to execute the object recognition processing with desired accuracy by spending appropriate hardware resources in accordance with the contact risk.

The processing load level setting unit 63 may assign points to the object presence region for each processing process that is repeated in a predetermined cycle, and may set the processing load level. In a case of detecting only moving objects excluding an object standing still, the sum of points may be set to 0 for an object whose calculated movement speed is zero. In addition, in accordance with a course of the vehicle 1, an object presence region whose object is not assumed to come into contact with the vehicle 1 may be regarded as being absent. The course of the vehicle 1 may be estimated from the steering angle of the steering wheel or the steered wheels of the vehicle 1. This makes it possible to lessen arithmetic processing load on the controller 51, without causing a decrease in safety against contact.

Note that the attributes of the object are mere examples, and the processing load level may be set on the basis of other information related to the contact risk. For example, the processing load level setting unit 63 may estimate a type of the object on the basis of, for example, the size and the speed of the object, and set the processing load level in accordance with the estimated type of the object. In one example, in a case where the type of the object is a person such as a pedestrian, the processing load level may be made higher than for other objects to enhance safety for the person. In addition, the processing load level setting unit 63 may calculate kinetic energy possessed by the object on the basis of a weight and the speed of the object that are estimated from, for example, the type and the size of the object. The processing load level setting unit 63 may assign higher points as the kinetic energy is larger. The setting examples illustrated in Table 1 and Table 2 are mere examples; thresholds for classification of the distance, the size, or the speed or relative speed, and the number of points to be assigned may be changed as appropriate. In the example illustrated in Table 1, the same points may be assigned in three levels for each of the distance, the size, and the speed, but a specific item may be weighted.

Object Recognition Processing Unit

For each object presence region set by the object presence region setting unit 61, the object recognition processing unit 65 executes the object recognition processing using at least the image data generated by the front imaging cameras 31LF and 31RF, in accordance with the level of the processing load set by the processing load level setting unit 63.

The object recognition processing unit 65 may be configured to mutually convert three-dimensional coordinates of a space observed by the LiDAR, 31S and three-dimensional coordinates of a space observed by the front imaging cameras 31LF and 31RF. The coordinate conversion may be unnecessary in a case where the LiDAR 31S and the front imaging cameras 31LF and 31RF are mounted at positions in alignment to make the three-dimensional coordinate of the space observed by the LiDAR 31.5 match the three-dimensional coordinate of the space observed by the front imaging cameras 31LF and 31RF.

FIG. 3 is an explanatory diagram illustrating, for each processing load level, the object recognition processing that is executed by the object recognition processing unit 65 in the example embodiment.

The object recognition processing unit 65 may make the number of processes to be executed for the object presence region set at the regular processing level smaller than the number of processes to be executed for the object presence regions se at the low-precision processing level and the high-precision processing level. This lessens the hardware resources to be spent on the object recognition processing for the object presence region of relatively low necessity.

In the example embodiment, for the object presence region set at the regular processing level, the object recognition processing unit 65 may execute, by using the image data, a process of estimating the type of the object and a process of estimating the distance to the object (i.e., a distance estimation process). The type of the object may be estimated by a lane line recognition process, a curb recognition process, a sign recognition process, and a motion detection process by feature matching. The lane line recognition process, the curb recognition process, and the sign recognition process may be executed by, for example, determining whether images corresponding to lane line image data, curb image data, and sign image data stored in the storage 53 in advance are present in the object presence region set at the regular processing level. The lane line recognition process, the curb recognition process, and the sign recognition process may be executed by another method.

The motion detection process by feature matching may be executed by determining whether an image corresponding to mobile body image data stored in the storage 53 in advance is present in the object presence region set at the regular processing level. For example, the object recognition processing unit 65 may compare respective pieces of image data generated by the left and right front imaging cameras 31LF and 31RF with the mobile body image data stored in the storage 53 to identify the corresponding mobile body. In a case where the front imaging camera is a monocular camera, the object recognition processing unit 65 may compare image data generated by the monocular camera with template image data of classified mobile bodies to identify the corresponding mobile body. Non-limiting examples of the mobile body may include a commercial vehicle, a four-wheeled vehicle, a motorcycle, a bicycle, and a pedestrian. Data on a mobile body other than these may be included. The distance estimation process may be executed on the basis of, for example, parallax information obtained by the left and right front imaging cameras 31LF and 31RF imaging a target identified by the lane line recognition process, the curb recognition process, the sign recognition process, and the motion detection process by feature matching.

The process of estimating the type of the object by the lane line recognition process, the curb recognition process, the sign recognition process, and the motion detection process by feature matching, and the process of estimating the distance to the object may be relatively low-load arithmetic processing. In other words, for an object presence region in which an object is estimated to be present but is at low contact risk, the type of the object and the distance to the object may be estimated by a low-processing-load arithmetic processing method, whereas the movement speed, the size, and the kinetic energy of the object may not be estimated.

For the object presence regions set at the low-precision processing level and the high-precision processing level, the object recognition processing unit 65 may execute a process of detecting an edge or outline of the object from the image data (i.e., an edge detection process). The object recognition processing unit 65 may also execute a process of estimating the type of the object on the basis of the extracted edge or outline (i.e., a type estimation process), the process of estimating the distance to the object (i.e., the distance estimation process), and a process of estimating the speed of the object (i.e., a speed estimation process). Furthermore, for the object presence regions set at the low-precision processing level and the high-precision processing level, the object recognition processing unit 65 may execute a process of estimating the size of the object (i.e., a size estimation process) and a process of estimating the kinetic energy possessed by the object (i.e., an energy estimation process), on the basis of information on the estimated type of the object, distance to the object, and speed of the object. In executing the type estimation process, the distance estimation process, the speed estimation process, the size estimation process, and the energy estimation process, low-load processing may select a low-load processing method, and high-load processing may select a high-load processing method.

For example, for the object presence region set at the low-precision processing level, the object recognition processing unit 65 may execute the process of detecting the edge or outline from the image data, and execute a process of extracting a shape feature set for each object on the basis of the extracted edge or outline data, to estimate the type of the object. In another example, for the object presence region set at the low-precision processing level, the object recognition processing unit 65 may execute the process of detecting the edge or outline from the image data, and execute a matching process with a shape pattern set for each object on the basis of the extracted edge or outline data, to estimate the type of the object. The process of estimating the type of the object by extracting the edge or outline of the object may be higher-load arithmetic processing than the lane line recognition process, the curb recognition process, the sign recognition process, and the motion detection process by feature matching that are executed at the regular processing level.

For the object presence region set at the high-precision processing level, the object recognition processing unit 65 may execute the process of detecting the edge or outline from the image data, and execute a process of estimating the type of the object by machine learning together with the process of extracting the shape feature set for each object on the basis of the extracted edge or outline data. The process of estimating the type of the object by machine learning may be performed by inputting the extracted edge or outline data to an object edge model, and obtaining outputted information on the type of the object. The object edge model may be generated by performing machine learning in advance by using, as learning data, edge or outline data of a mobile body to be learnt and data on a type of the mobile body. A machine learning model may be a calculation model using, for example, a support vector machine, a neighborhood method, a neural network such as deep learning, or a Bayesian network. Additionally executing the process of estimating the type of the object by machine learning makes it possible to enhance accuracy in estimating the type of the object.

In addition, for the object presence regions se at the low-precision processing level and the high-precision processing level, the object recognition processing unit 65 may execute the speed estimation process based on a temporal change in a movement distance of the extracted edge or outline. The temporal change in the movement distance of the edge or outline may be calculated by comparing image frames that are generated in time series.

Furthermore, for the object presence regions set at the low-precision processing level and the high-precision processing level, the object recognition processing unit 65 may execute the process of estimating the size of the object and the process of estimating the kinetic energy possessed by the object. The kinetic energy possessed by the object ($W=Fs=\frac{1}{2}\times mv^2$) may have an influence on the extent of damage assumed to be caused by contact with the vehicle 1. The kinetic energy may have a larger value as a mass m of the object is larger and as a movement speed v of the object is faster. In the estimation, the accuracy in estimating the type of the object is higher at the high-precision processing level than at the low-precision processing level, which accordingly enhances accuracy in estimating the size of the object and the kinetic energy possessed by the object to be estimated.

The object recognition processing unit 65 may be set to execute the object recognition processing in order from a larger sum of points, i.e., in the order of the high-precision processing level, the low-precision processing level, and the regular processing level. Thus, the high-precision processing level is given higher priority than the low-precision processing level in terms of software, which makes it possible to more quickly and accurately calculate information on an object at high contact risk.

In addition, for an object once detected, the object recognition processing unit 65 may perform a labeling process, i.e., a process of assigning a label, and skip the process of estimating the type and the size of the object by executing a process of tracing the object by utilizing the front imaging cameras 31LF and 31RF or the LiDAR 31S. This makes it possible to further lessen arithmetic processing load on the object recognition apparatus 50.

In a case where no object presence region is set at the high-precision processing level or no object presence region is set at the high-precision processing level and the low-precision processing level, the object recognition processing unit 65 may execute, for the object presence region set at the regular processing level, a part or all of the processing contents to be executed at the precision processing level. This makes it possible to achieve a duplexed system together with the object recognition processing using the LiDAR 31S. This enables recognition of information not detected by the LiDAR 31S, contributing to a reduction in contact risk.

Note that contents of the object recognition processing corresponding to the processing load level illustrated in FIG. 3 are mere examples, and the contents are not limited thereto.

Furthermore, the object recognition processing unit 65 may calculate the risk of contact with the vehicle 1, on the basis of information on the estimated type of the object, distance to the object, speed of the object, size of the object, and kinetic energy possessed by the object. The object recognition processing unit 65 may transmit the calculated information on the object to the vehicle control apparatus 41. Receiving the information on the object, the vehicle control apparatus 41 may execute the automatic driving control while avoiding contact with the object, and execute the emergency braking control or emergency steering control for avoidance of contact with the object or lessening of impact upon contact.

2-3. Operation of Object Recognition Apparatus

Figure 4:
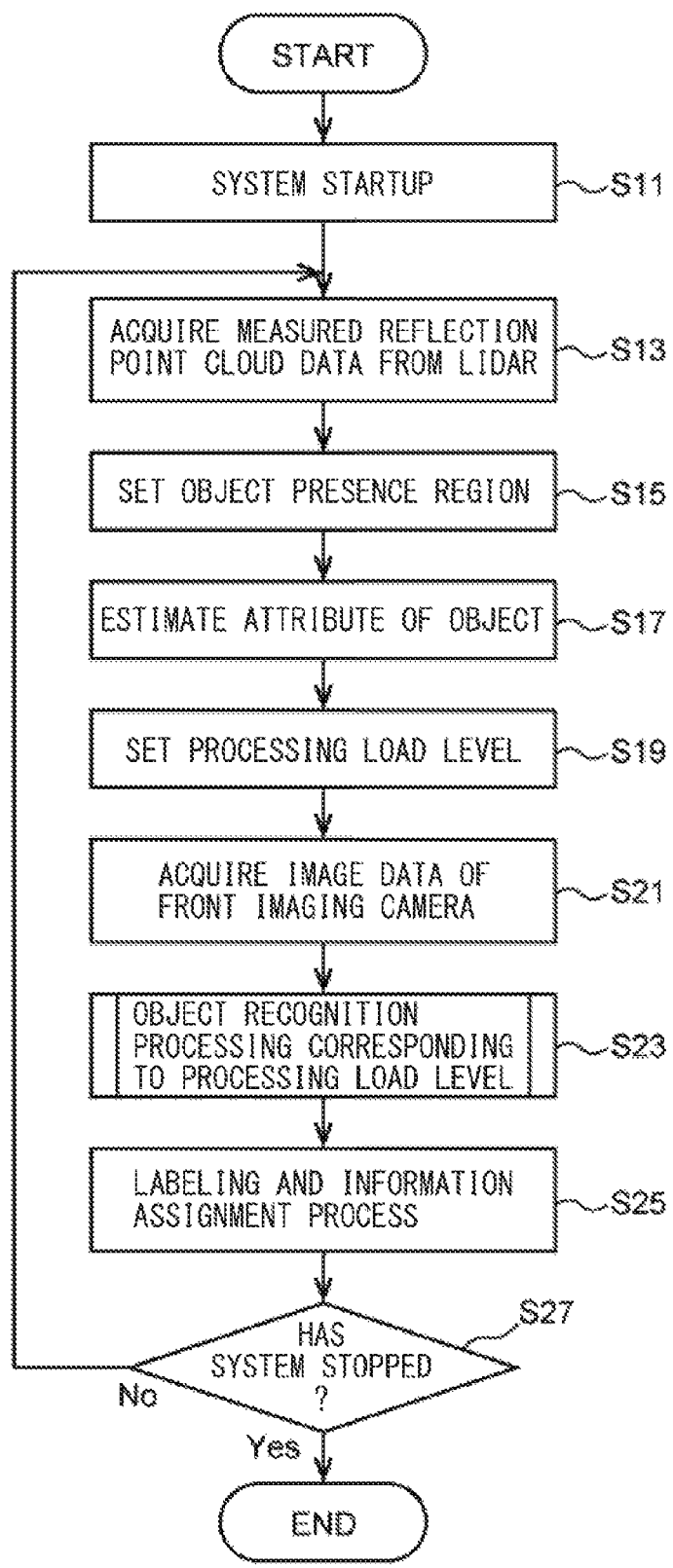
FIG. 4 is a flowchart illustrating an example operation of the object recognition apparatus according to one example embodiment.
Figure 5:
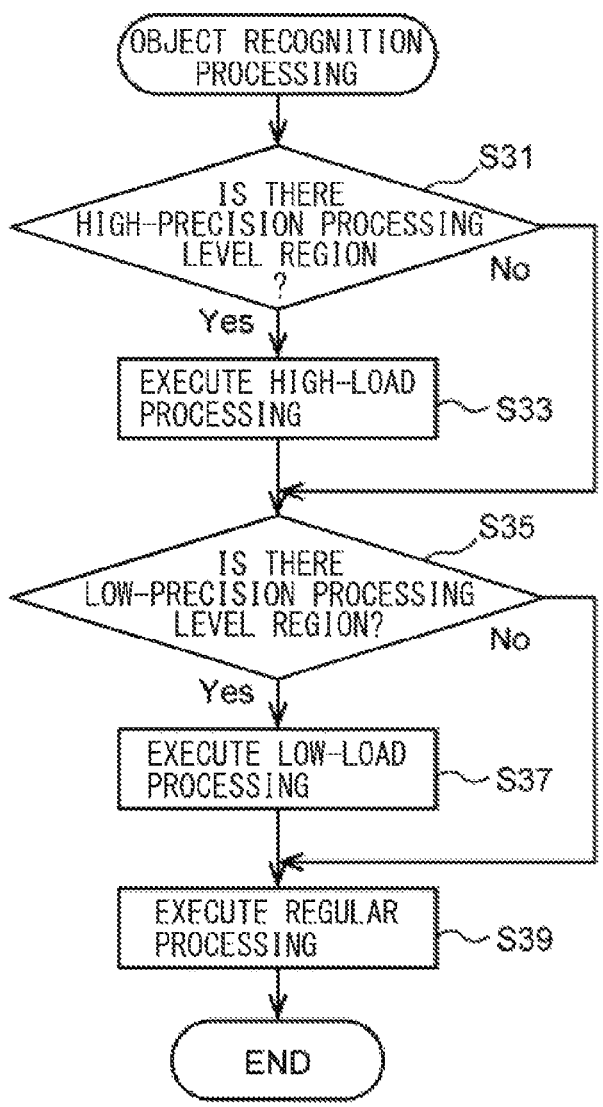
FIG. 5 is a flowchart illustrating an example of the object recognition processing according to one example embodiment.

Description is given below, along flowcharts, of an example of operation of the object recognition apparatus 50 according to the example embodiment. FIG. 4 and FIG. 5 are flowcharts illustrating processing that is executed by the object recognition apparatus 50.

First, upon startup of an in-vehicle system including the object recognition apparatus 50 (step S11), the object presence region setting unit 61 of the controller 51 may acquire measured reflection point cloud data that is transmitted from the LiDAR 31S (step S13). Thereafter, the object presence region setting unit 61 may set the object presence region in the detection range of the LiDAR 31S, on the basis of the acquired reflection point cloud data (step S15). In one example, the object presence region setting unit 61 may execute the clustering process of grouping reflection points between which distance is shorter than the predetermined distance. Thereafter, in a case where an area of a region in which the grouped reflection point cloud is present exceeds the predetermined range set in advance, the object presence region setting unit 61 may set the region as the object presence region.

Thereafter, the object presence region setting unit 61 may estimate the attribute of the object that is likely to be present in each set object presence region (step S17). As described above, the object presence region setting unit 61 may calculate, on the basis of the reflection point cloud data detected by the LiDAR 31S, information on the distance from the vehicle 1 to the object, the size of the object, and the movement speed or relative speed of the object.

Thereafter, on the basis of the attribute of the object estimated by the object presence region setting unit 61, the processing load level setting unit 63 of the controller 51 may set, for each object presence region, the level of the processing load to be spent on the object recognition processing to be executed by using at least the image data generated by the front imaging cameras 31LF and 31RF (step S19). The level of the processing load may be set in accordance with the contact risk of the object, and may be set to a higher level as the contact risk is greater. The contact risk may be estimated from the attribute of the object that is likely to be present in each object presence region. In the example embodiment, the processing load level setting unit 63 may set the level of the processing load to one of the regular processing level at which the processing load is low, or the low-precision processing level or the high-precision processing level at which the processing load is higher than at the regular processing level.

Figure 6:
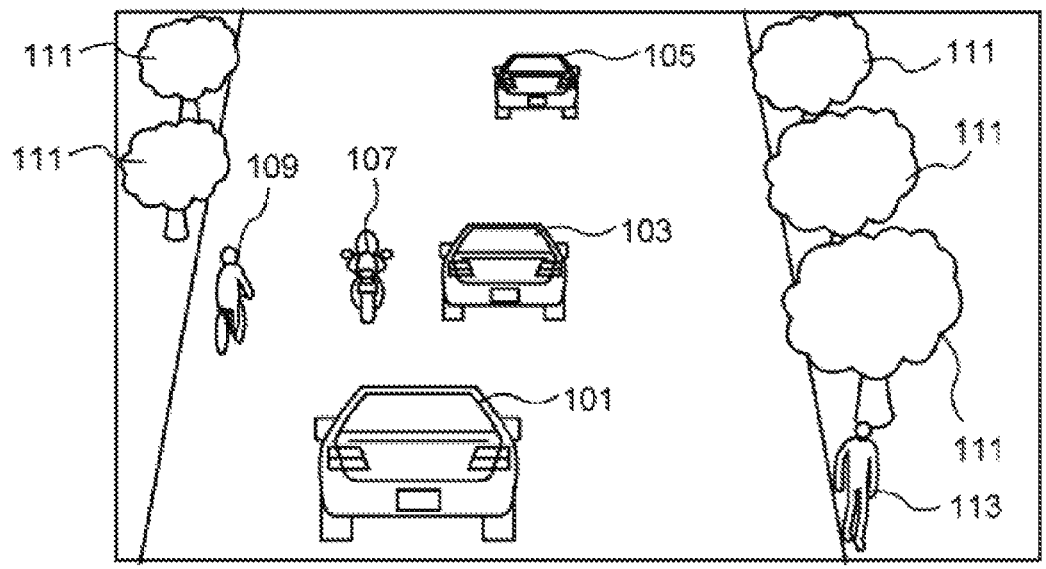
FIG. 6 is an explanatory diagram illustrating an example of view in front of the vehicle.

Description will be given, with reference to FIG. 6 to FIG. 8, of an example of the processing from the setting of the object presence region to the setting of the processing load level. FIG. 6 illustrates an example of view in front of the vehicle 1. In the example illustrated in FIG. 6, a first preceding vehicle 101, a second preceding vehicle 103, and a third preceding vehicle 105 may be traveling toward the same direction in front of the vehicle 1, in order from the near side in the traveling direction. A motorcycle 107 may be traveling toward the same direction on the left of the second preceding vehicle 103. A bicycle 109 may be present at the left end of the road, and a pedestrian 113 may be present at the right end of the road. Furthermore, roadside trees 111 may be present on both sides of the road.

Figure 7:
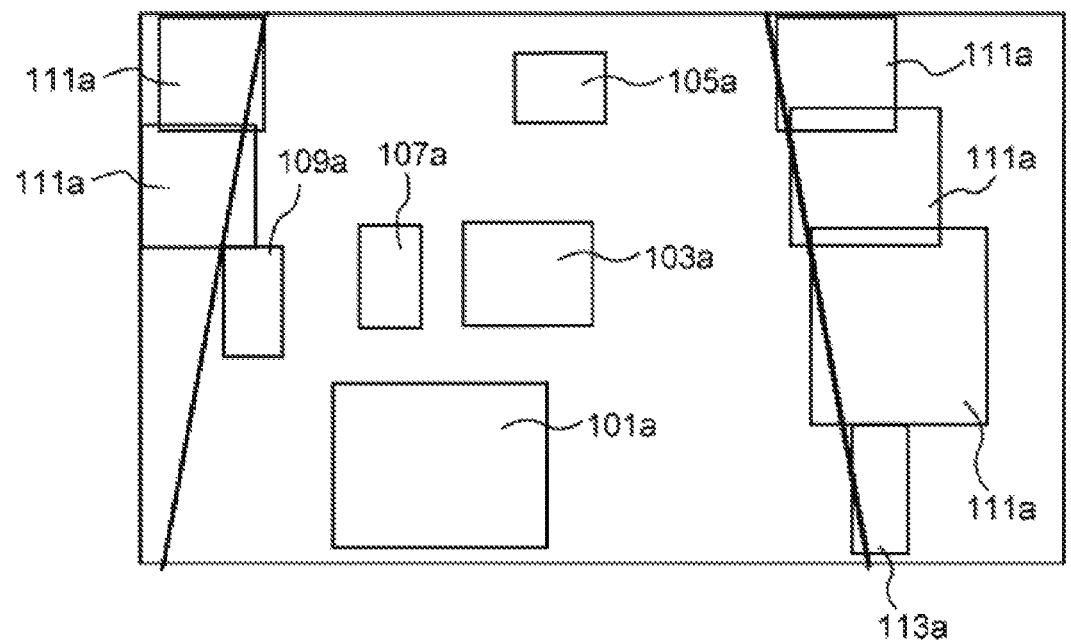
FIG. 7 is an explanatory diagram illustrating object presence regions set by the object recognition apparatus according to one example embodiment.

FIG. 7 illustrates object presence regions set by the object presence region setting unit 61. The object presence region setting unit 61 may perform the clustering process on the reflection point cloud data detected by the LiDAR 31S, and set the object presence region to include each grouped reflection point cloud. Object presence regions 101a, 103a, and 105a may respectively be set at positions where the first preceding vehicle 101, the second preceding vehicle 103, and the third preceding vehicle 105 are present. Object presence regions 107a, 109a, and 113a may respectively be set at positions where the motorcycle 107, the bicycle 109, and the pedestrian 113 are present. Furthermore, object presence regions 111a may respectively be set at positions where the roadside trees 111 are present. The object presence region to be set is not limited to a rectangular region that is set to include the grouped reflection point cloud, and may be a circular or elliptical region or a region with another appropriate shape.

Figure 8:
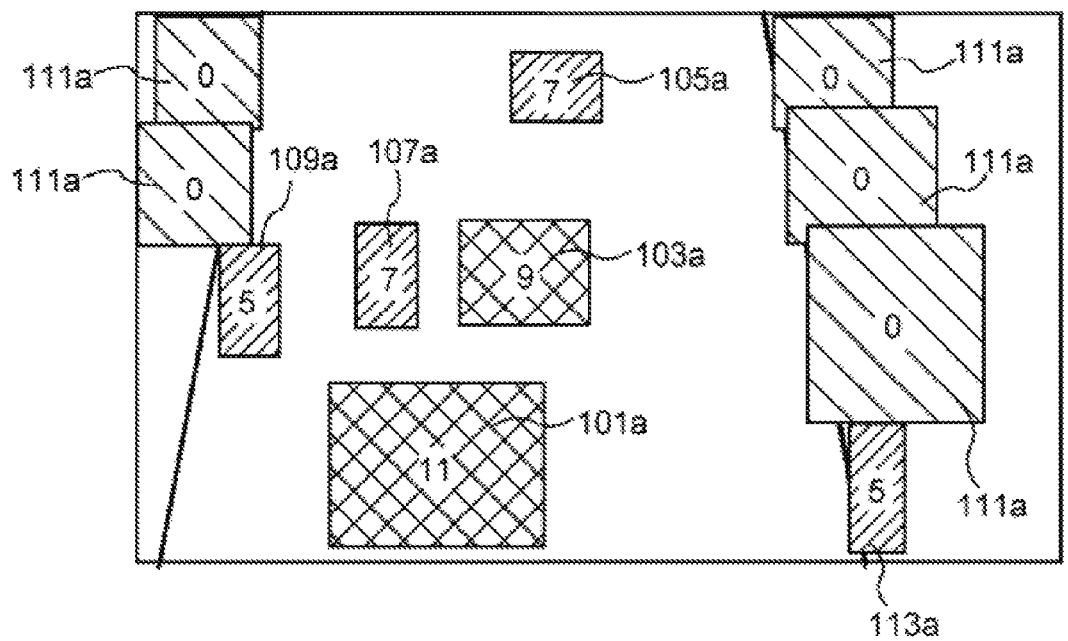
FIG. 8 is an explanatory diagram illustrating a level of processing load set for each object presence region by the object recognition apparatus according to one example embodiment.

FIG. 8 illustrates the level of the processing load set for each object presence region by the processing load level setting unit 63. For example, in a case where the distance to the first preceding vehicle 101 is 40 meters, the size of the first preceding vehicle 101 as seen from the vehicle 1 is 3 m$^2$, and the speed of the first preceding vehicle 101 is 40 km/h, the processing load level setting unit 63 may assign 11 (5+3+3) points to the object presence region 101a corresponding to the first preceding vehicle 101, in accordance with Table 1 above. In a case where the distance to the second preceding vehicle 103 is 60 meters, the size of the second preceding vehicle 103 as seen from the vehicle 1 is 3 m$^2$, and the speed of the second preceding vehicle 103 is 40 km/h, the processing load level setting unit 63 may assign 9 (3-1-3-1-3) points to the object presence region 103a corresponding to the second preceding vehicle 103, in accordance with Table 1 above.

In a case where the distance to the third preceding vehicle 105 is 100 meters, the size of the third preceding vehicle 105 as seen from the vehicle 1 is 3 m$^2$, and the speed of the third preceding vehicle 105 is 40 km/h, the processing load level setting unit 63 may assign 7 (1+3+3) points to the object presence region 105a corresponding to the third preceding vehicle 105, in accordance with Table 1 above. In a case where the distance to the motorcycle 107 is 60 meters, the size of the motorcycle 107 as seen from the vehicle 1 is 1.5 m$^2$, and the speed of the motorcycle 107 is 40 km/h, the processing load level setting unit 63 may assign 7 (3+1+3) points to the object presence region 107a corresponding to the motorcycle 107, in accordance with Table 1 above.

In a case where the distance to the bicycle 109 is 50 meters, the size of the bicycle 109 as seen from the vehicle 1 is 1 m$^2$, and the speed of the bicycle 109 is 5 km/h, the processing load level setting unit 63 may assign 5 (3+1+1) points to the object presence region 109a corresponding to the bicycle 109, in accordance with Table 1 above. In a case where the distance to the pedestrian 113 is 50 meters, the size of the pedestrian 113 as seen from the vehicle 1 is 0.8 m$^2$, and the speed of the pedestrian 113 is 2 km/h, the processing load level setting unit 63 may assign 5 (3+1+1) points to the object presence region 113a corresponding to the pedestrian 113, in accordance with Table 1 above.

The calculated speed of the roadside tree 111 may be 0 km/h, and the processing load level setting unit 63 may accordingly set the sum of points of the object presence region 111a corresponding to the roadside tree 111 to 0. This enables the level of the processing load for the object presence region in which the movement speed of the object that is estimated is zero to be set to the lightest processing load level.

On the basis of the sum of the assigned points, the processing load level setting unit 63 may set the processing load level for each object presence region in accordance with Table 2. In the example illustrated in FIG. 8, the processing load level setting u 63 may set the object presence regions 101a and 103a corresponding to the first preceding vehicle 101 and the second preceding vehicle 103 at the high-precision processing level. The processing load level setting unit 63 may set the object presence regions 105a, 107a, 109a, and 113a corresponding to the third preceding vehicle 105, the motorcycle 107, the bicycle 109, and the pedestrian 113 at the low-precision processing level. The processing load level setting unit 63 may set the object presence region 111a corresponding to the roadside tree 111, where the movement speed is zero and the sum of points is set to 0, at the regular processing level at which the processing load is lightest.

Referring back to the flowchart of FIG. 4, after the processing load level of each object presence region is set in step S19, the object recognition processing unit 65 of the controller 51 may acquire the image data generated by the front imaging cameras 31LF and 31RF (step S21). Thereafter, the object recognition processing unit 65 may execute, for each object presence region, the object recognition processing in accordance with the processing load level set by the processing load level setting unit 63 (step S23).

FIG. 5 is a flowchart illustrating the object recognition processing.

First, the object recognition processing unit 65 may determine whether there is an object presence region set at the high-precision processing level (step S31). If there is no object presence region set at the high-precision processing level (S31/No), the object recognition processing unit 65 may cause the flow to proceed to step S35. If there is an object presence region set at the high-precision processing level (S31/Yes), the object recognition processing unit 65 may execute, for the corresponding object presence region, processing set for processing contents at the high-precision processing level, i.e., high-load processing (step S33). In the example described above, the object recognition processing unit 65 may execute the high-load processing for the object presence regions 101a and 103a corresponding to the first preceding vehicle 101 and the second preceding vehicle 103 (see FIG. 3).

Thereafter, the object recognition processing unit 65 may determine whether there is an object presence region set at the low-precision processing level (step S35). If there is no object presence region set at the low-precision processing level (S35/No), the object recognition processing unit 65 may cause the flow to proceed to step S39. If there is an object presence region set at the low-precision processing level (S35/Yes), the object recognition processing unit 65 may execute, for the corresponding object presence region, processing set for processing contents at the low-precision processing level, i.e., low-load processing (step S37). In the example described above, the object recognition processing unit 65 may execute the low-load processing for the object presence regions 105*a*, 107*a*, 109*a*, and 113*a* corresponding to the third preceding vehicle 105, the motorcycle 107, the bicycle 109, and the pedestrian 113 (see FIG. 3).

Thereafter, the object recognition processing unit 65 may execute, for the object presence region set at the regular processing level, processing set for processing contents at the regular processing level, i.e., regular processing (step S39). In the example described above, the object recognition processing unit 65 may execute the regular processing for the object presence region 111*a* corresponding to the roadside tree 111 (see FIG. 3).

In the object recognition processing illustrated in FIG. 5, the object recognition processing may be executed in the order of the high-load processing, the low-load processing, and the regular processing. This gives high priority to processing for a region of high importance, making it possible to more quickly and accurately calculate information on an object at high contact risk.

In the example embodiment, in executing the object recognition processing, the labeling process, i.e., the process of assigning a label, may be performed for the object detected in an earlier processing process. Accordingly, for an object once detected, the process of estimating the type and the size of the object may be skipped by executing the process of tracing the object by utilizing the front imaging cameras 31LF and 31RF or the LiDAR 31S. This makes it possible to further lessen the arithmetic processing load on the object recognition apparatus 50.

In a case where no object presence region is set at the high-precision processing level or no object presence region is set at the high-precision processing level and the low-precision processing level, a part or all of the processing contents to be executed at the precision processing level may be executed for the object presence region set at the regular processing level. This makes it possible to achieve a duplexed system together with the object recognition processing using the LiDAR 31S. This enables recognition of information not detected by the LiDAR 31S, contributing to a reduction in contact risk.

Referring back to the flowchart of FIG. 4, after the object recognition processing corresponding to the processing load level is executed, the object recognition processing unit 65 may execute, for the detected object, the labeling process and the process of assigning information (step S25).

Figure 9:
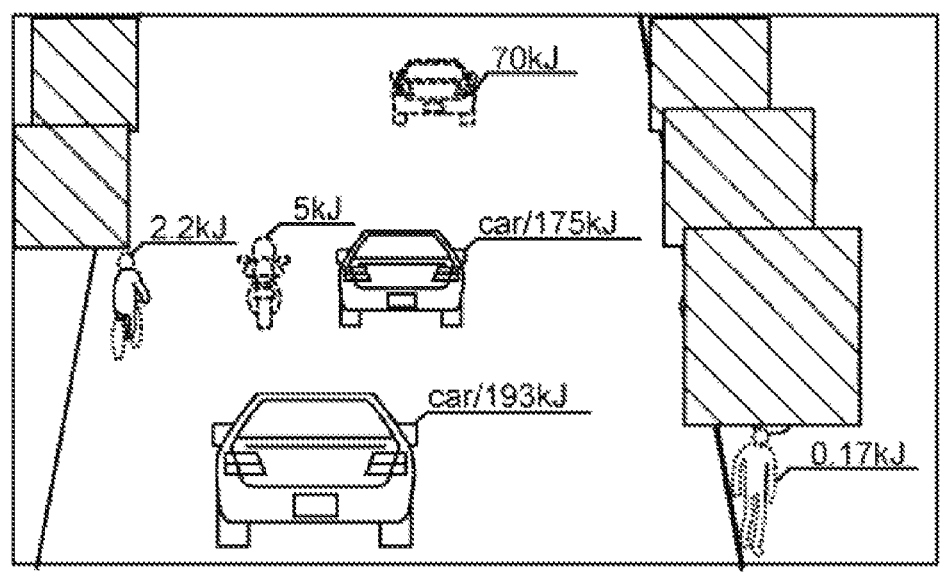
FIG. 9 is an explanatory diagram illustrating an example in which a labeling process and a process of assigning information have been executed by the object recognition apparatus according to one example embodiment.

FIG. 9 illustrates an example in which the labeling process and the process of assigning information have been executed.

In the example illustrated in FIG. 9, the first preceding vehicle 101 and the second preceding vehicle 103 corresponding to the object presence regions 101*a* and 103*a* that have been subjected to the high-load processing may be labeled with information on the type of the object, e.g., labeled as a car, and assigned with information on the kinetic energy possessed by the object. The third preceding vehicle 105, the motorcycle 107, the bicycle 109, and the pedestrian 113 corresponding to the object presence regions 105*a*, 107*a*, 109*a*, and 113*a* that have been subjected to the low-load processing may be assigned with information on the kinetic energy possessed by the object. In contrast, the roadside tree 111 corresponding to the object presence region 111*a* that has been subjected to the regular processing may be assigned with only information indicating the object presence region.

Referring back to the flowchart of FIG. 4, after the labeling process and the process of assigning information are executed, the object recognition processing unit 65 may determine whether the in-vehicle system has stopped (step S27), If the in-vehicle system has stopped (S27/Yes), the controller 51 may end the series of processes. If the in-vehicle system has not stopped (S27/No), the controller 51 may cause the flow to return to step S13, and repeatedly execute the processes of the respective steps described above.

In this manner, the object recognition apparatus 50 according to the example embodiment sets the object presence region on the basis of the observation data obtained by the LiDAR 31S having a relatively lower degree of reliability than the imaging device. The object recognition apparatus 50 estimates the attribute of the object that is likely to be present in each object presence region. On the basis of the attribute of the object, the object recognition apparatus 50 sets the level of the processing load to be spent on the object recognition processing to be executed by using the image data generated by the front imaging cameras 31LF and 31RF. The object recognition apparatus 50 executes, for each object presence region, the object recognition processing corresponding to the set level of the processing load.

This makes it possible to concentrate, on the object presence region exhibiting a high risk of contact with the vehicle 1, resources of the object recognition processing using the image data of the front imaging cameras 31LF and 31RF. This ensures accuracy in recognizing an object at high risk of contact with the vehicle 1, while lessening arithmetic processing load on an existing system relying on an imaging device. This makes it possible to improve reliability of an object recognition result.

It is possible to concentrate resources of the object recognition processing on a region of high necessity, which makes it possible to keep resources for future various kinds of processing, also making it possible to adapt to function extension of the object recognition apparatus 50.

In the above description, some example embodiments and modification examples of the technology are described in detail with reference to the accompanying drawings. However, it should be appreciated that the example embodiments of the technology described above are merely illustrative and non-limiting and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, the object recognition processing unit 65 may make a resolution in a case of executing arithmetic processing as processing at the low-precision processing level lower than a resolution in a case of executing arithmetic processing as processing at the high-precision processing level. In one example, the object recognition processing unit 65 may cause a region to be irradiated by the LiDAR 31S to be irradiated with a resolution obtained by multiplying, by a factor, the maximum resolution with which the LiDAR 31S is able to apply laser light. For example, for a LiDAR originally having a resolution of 200×200 pixels, i.e., 40K pixels, reflected light may be received with laser light applied in the proportion of one out of four, by setting the resolution with the factor set to 0.25. In this manner, it is possible to make a difference in spatial resolution. This makes it possible to lessen the hardware resources to be spent on the object presence region of relatively low necessity, making it possible to lessen the arithmetic processing load on the object recognition apparatus 50. It is also possible to spend more hardware resources on the object presence region of relatively high necessity, making it possible to further enhance the reliability of the object recognition result for the region.

In another example, the object recognition processing unit 65 may make a frequency of executing arithmetic processing as processing at the low-precision processing level lower than a frequency of executing arithmetic processing as processing at the high-precision processing level. For example, in a processing process that is repeated at predetermined intervals, the processing at the high-precision processing level may be executed each time, whereas the processing at the low-precision processing level may be executed every other time. This makes it possible to lessen the hardware resources to be spent on the object presence region of relatively low necessity, making it possible to lessen the arithmetic processing load on the object recognition apparatus 50. It is also possible to spend more hardware resources on the object presence region of relatively high necessity, making it possible to further enhance the reliability of the object recognition result for the region. Needless to say, in this case, the object recognition processing at the high-precision processing level may be executed if the object presence region set at the low-precision processing level in the previous processing process is set at the high-precision processing level in the present processing process.

Each of the object presence region setting unit 61, the processing load level setting unit 63, and the object recognition processing unit 65 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the object presence region seating unit 61, the processing load level setting unit 63, and the object recognition processing unit 65. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a. DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the object presence region setting unit 61, the processing load level setting unit 63, and the object recognition processing unit 65 illustrated in FIG. 2.

The invention claimed is:

1. An object recognition apparatus comprising:
one or more processors; and
one or more memories communicably coupled to the one or more processors,
the one or more processors being configured to:
set one or more object presence regions in each of which an object is likely to be present, on a basis of observation data of a distance sensor, the distance sensor being configured to receive a reflected wave of an applied electromagnetic wave;
estimate an attribute of the object that is likely to be present in each of the one or more object presence regions;
set a level of processing load to be allocated to object recognition for each of the one or more object presence regions based on the attributes of each object, using at least image data generated by an imaging device; and
perform the object recognition processing on the each of the one or more object presence regions based on the set level of the processing load, using at least image data generated by the imaging device.

2. The object recognition apparatus according to claim 1, wherein the one or more processors are configured to set the level of the processing load for the each of the one or more object presence regions, in accordance with a contact risk of the object, the contact risk being estimated from the attribute of the object.

3. The object recognition apparatus according to claim 1, wherein
the attribute of the object includes information on a movement speed of the object to be estimated by the one or more processors, and
the one or more processors are configured to set the level of the processing load for an object presence region in which the estimated movement speed of the object is zero, out of the one or more object presence regions, to a lightest processing load level.

4. The object recognition apparatus according to claim 1, wherein the one or more processors are configured to set the level of the processing load to one of a regular processing level at which the processing load is low or a precision processing level at which the processing load is higher than at the regular processing level.

5. The object recognition apparatus according to claim 4, wherein the one or more processors are configured to make a number of processes to be executed as the object recognition processing at the regular processing level smaller than a number of processes to be executed as the object recognition processing at the precision processing level.

6. The object recognition apparatus according to claim 4, wherein the one or more processors are configured to
execute, as the object recognition processing at the regular processing level, at least a matching process for the object with object data set in advance and a distance estimation process for the object on a basis of the image data, and
execute, as the object recognition processing at the precision processing level, two or more of an edge detection process for the object, a type estimation process for the object, a speed estimation process for the object, the distance estimation process for the object, a size estimation process for the object, or an energy estimation process for the object.

7. The object recognition apparatus according to claim 6, wherein the precision processing level includes a low-precision processing level at which the processing load is relatively low and a high-precision processing level at which the processing load is relatively high.

8. The object recognition apparatus according to claim 7, wherein
low-load processing that causes relatively low processing load and high-load processing that causes relatively high processing load are set for at least one of the edge detection process, the type estimation process, the speed estimation process, the distance estimation process, the size estimation process, or the energy estimation process, and
the one or more processors are configured to
select and execute the low-load processing in a case of executing, as the object recognition processing at the low-precision processing level, one of the edge detection process, the type estimation process, the speed estimation process, the distance estimation process, the size estimation process, or the energy estimation process, and
select and execute the high-load processing in a case of executing, as the object recognition processing at the high-precision processing level, one of the edge detection process, the type estimation process, the speed estimation process, the distance estimation process, the size estimation process, or the energy estimation process.

9. The object recognition apparatus according to claim 7, wherein the one or more processors are configured to make a resolution in a case of executing, as the object recognition processing at the low-precision processing level, the edge detection process, the type estimation process, the speed estimation process, the distance estimation process, the size estimation process, or the energy estimation process lower than a resolution in a case of executing, as the object recognition processing at the high-precision processing level, the edge detection process, the type estimation process, the speed estimation process, the distance estimation process, the size estimation process, or the energy estimation process.

10. The object recognition apparatus according to claim 7, wherein the one or more processors are configured to make a frequency of executing, as the object recognition processing at the low-precision processing level, the edge detection process, the type estimation process, the speed estimation process, the distance estimation process, the size estimation process, or the energy estimation process lower than a frequency of executing, as the object recognition processing at the high-precision processing level, the edge detection process, the type estimation process, the speed estimation process, the distance estimation process, the size estimation process, or the energy estimation process.

11. An object recognition apparatus comprising:
an object presence region setting unit configured to set one or more object presence regions in each of which an object is likely to be present, on a basis of observation data of a distance sensor, and estimate an attribute of the object that is likely to be present in each of the one or more object presence regions, the distance sensor being configured to receive a reflected wave of an applied electromagnetic wave;
a processing load level setting unit configured to set a level of processing load to be allocated to object recognition for each of the one or more object presence regions based on the attributes of each object, using at least image data generated by an imaging device; and
an object recognition processing unit configured to perform the object recognition processing on the each of the one or more object presence regions based on the set level of the processing load, using at least image data generated by the imaging device.

12. A non-transitory recording medium containing a computer program, the computer program causing, when executed by a processor, the processor to implement a method, the method comprising:
setting one or more object presence regions in each of which an object is likely to be present, on a basis of observation data of a distance sensor, the distance sensor being configured to receive a reflected wave of an applied electromagnetic wave;
estimating an attribute of the object that is likely to be present in each of the one or more object presence regions;
setting a level of processing load to be allocated to object recognition for each of the one or more object presence regions based on the attributes of each object, using at least image data generated by an imaging device; and
performing the object recognition processing on the each of the one or more object presence regions based on the set level of the processing load, using at least image data generated by the imaging device.

* * * * *